(12) United States Patent
Cao et al.

(10) Patent No.: US 11,806,974 B2
(45) Date of Patent: Nov. 7, 2023

(54) DISPLAY PANEL, DISPLAY DEVICE AND MANUFACTURING METHOD THEREOF

(71) Applicant: BOE TECHNOLOGY GROUP CO., LTD., Beijing (CN)

(72) Inventors: Fangxu Cao, Beijing (CN); Pinfan Wang, Beijing (CN); Haoran Wang, Beijing (CN); Xiaofei Luo, Beijing (CN); Yaming Wang, Beijing (CN); Zuojia Wang, Beijing (CN); Hejin Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 9 days.

(21) Appl. No.: 17/222,150

(22) Filed: Apr. 5, 2021

(65) Prior Publication Data
US 2022/0080697 A1 Mar. 17, 2022

(30) Foreign Application Priority Data

Sep. 16, 2020 (CN) .......................... 202010973177.5

(51) Int. Cl.
B32B 3/02 (2006.01)
B32B 37/14 (2006.01)

(52) U.S. Cl.
CPC .............. B32B 3/02 (2013.01); B32B 37/142 (2013.01); B32B 2457/20 (2013.01)

(58) Field of Classification Search
None
See application file for complete search history.

(56) References Cited

U.S. PATENT DOCUMENTS

| 2009/0103001 | A1 | 4/2009 | Choi |
| 2016/0278222 | A1* | 9/2016 | Lee ................... G02F 1/133305 |
| 2019/0037712 | A1* | 1/2019 | Kim ..................... H05K 5/0204 |
| 2020/0026332 | A1 | 1/2020 | Hong et al. |
| 2020/0057525 | A1 | 2/2020 | Prest et al. |
| 2020/0168824 | A1* | 5/2020 | Park ........................ G09F 9/301 |

FOREIGN PATENT DOCUMENTS

| CN | 108766977 A | 11/2018 |
| CN | 110783498 A | 2/2020 |
| CN | 110970483 A * | 4/2020 |

(Continued)

OTHER PUBLICATIONS

CN-110970483-A_machine_translation (Year: 2020).*
First Office Action for CN Patent Application No. 202010973177.5 dated Nov. 2, 2021.

Primary Examiner — Francisco W Tschen
Assistant Examiner — Abhishek A Patwardhan
(74) Attorney, Agent, or Firm — XSENSUS LLP

(57) ABSTRACT

A display panel, a display device and a manufacturing method thereof are provided. The display device includes a display panel laminated to the curved cover plate. A main display area, a first sub-area, and a second sub-area of the display panel each include multiple through holes penetrating through the display panel, and the through holes define pixel islands for display and bridges for signal transmission; the through holes are disposed around the pixel islands; a part of the bridge is located between the pixel island and the through hole, the other part is located between adjacent through holes.

17 Claims, 6 Drawing Sheets

(56) References Cited

FOREIGN PATENT DOCUMENTS

| | | |
|---|---|---|
| CN | 110992827 A | 4/2020 |
| CN | 111584595 A | 8/2020 |
| CN | 111584606 A | 8/2020 |
| CN | 11627332 A | 9/2020 |
| CN | 111627330 A | 9/2020 |
| JP | 2002229006 A | 8/2002 |
| KR | 20190085579 A | 7/2019 |

* cited by examiner

DISPLAY PANEL, DISPLAY DEVICE AND MANUFACTURING METHOD THEREOF

CROSS-REFERENCE TO RELATED APPLICATION

This application claims the benefit of and priority to Chinese Patent Application No. 202010973177.5, filed on Sep. 16, 2020, the disclosure of which is incorporated herein by reference in its entirety.

TECHNICAL FIELD

The present disclosure relates to the field of display technologies and, in particular, to a display panel, a display device, and a manufacturing method thereof.

BACKGROUND

At present, from a perspective of a market trend, flexible display products have received attention for inclusion in electronic devices, such as mobile phones and tablet computers. The flexible display products may be designed to match different shaped models according to the electronic devices so as to meet different curved display requirements. When a display panel is laminated to a curved cover plate, compression wrinkles or cracks corner easily occur in corner areas of the display panel, which affects a display effect.

It should be noted that the information disclosed in the Background section above is only for enhancing the understanding of the background of the present disclosure, and thus may include information that does not constitute prior art known to those of ordinary skill in the art.

SUMMARY

A first aspect of the present disclosure provides a display device, including a curved cover plate and a display panel laminated to the curved cover plate. The display panel includes a main display area and a peripheral area surrounding the main display area. The peripheral area includes a first side edge area extending in a first direction, a second side edge area extending in a second direction, and a corner area located between the first side edge area and the second side edge area; the corner area includes a corner display area and a corner non-display area located in the corner area away from the main display area; and the corner display area has a first sub-area close to the main display area and a second sub-area area away from the main display area. The main display area, the first sub-area, and the second sub-area each include a plurality of through holes penetrating through the display panel, and the plurality of through holes define pixel islands for display and bridges for signal transmission. The plurality of through holes are disposed around the pixel islands. A part of the bridge is located between the pixel island and the through hole, and the other part is located between adjacent through holes.

A second aspect of the present disclosure provides a method of manufacturing a display device, including:

providing a curved cover plate;

providing a flat display panel, the display panel includes a main display area and a peripheral area surrounding the main display area. The peripheral area includes a first side edge area extending in a first direction, a second side edge area extending in a second direction, and a corner area located between the first side edge area and the second side edge area; the corner area includes a corner display area and a corner non-display area located in the corner display area away from the main display area; and the corner display area has a first sub-area close to the main display area and a second sub-area area away from the main display area; the main display area, the first sub-area, and the second sub-area each include a plurality of through holes penetrating through the display panel, and the plurality of through holes define pixel islands for display and bridges for signal transmission; the plurality of through holes are disposed around the pixel island; a part of the bridge is located between the pixel island and the through hole, and the other part is located between adjacent through holes;

laminating the display panel to the curved cover plate.

A third aspect of the present disclosure provides a display panel. The display panel includes a main display area and a peripheral area surrounding the main display area. The peripheral area includes a first side edge area extending in a first direction, a second side edge area extending in a second direction, and a corner area located between the first side edge area and the second side edge area; the corner area includes a corner display area and a corner non-display area located in the corner area away from the main display area; and the corner display area has a first sub-area close to the main display area and a second sub-area area away from the main display area. The main display area, the first sub-area, and the second sub-area each include a plurality of through holes penetrating through the display panel, and the plurality of through holes define pixel islands for display and bridges for signal transmission. The plurality of through holes are disposed around the pixel islands. A part of the bridge is located between the pixel island and the through hole, and the other part is located between adjacent through holes.

It should be noted that the above general description and the following detailed description are merely exemplary and explanatory and should not be construed as limiting of the disclosure.

BRIEF DESCRIPTION OF THE DRAWINGS

The accompanying drawings, which are incorporated in the specification and constitute a part of the specification, show exemplary embodiments of the present disclosure. The drawings along with the specification explain the principles of the present disclosure. It is understood that the drawings in the following description show only some of the embodiments of the present disclosure, and other drawings may be obtained by those skilled in the art without paying creative labor from the drawings described herein.

DETAILED DESCRIPTION

Figure 1:
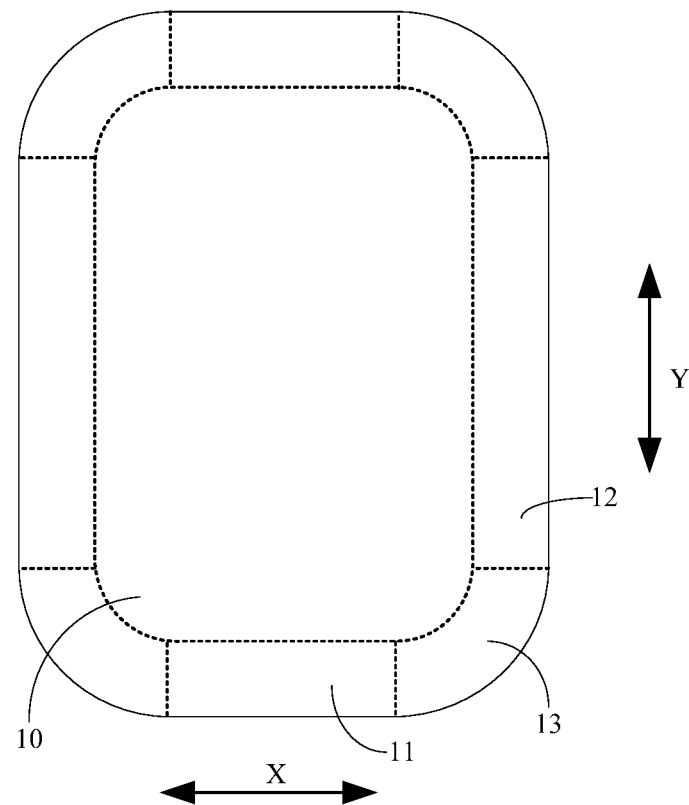
FIG. 1 is a schematic diagram illustrating a distribution of respective areas in a display panel described in an embodiment of the present disclosure.

In order to make objectives, technical solutions, and advantages of the present disclosure clearer, embodiments of the present disclosure will be described in detail below with reference to the accompanying drawings. Please note that the embodiments may be implemented in a number of different forms. Those of ordinary skill in the art may easily understand the fact that a method and content may be transformed into various forms without departing from the purpose and scope of the present disclosure. Therefore, the present disclosure should not be interpreted as being limited to content described in the following embodiments. In a case of no conflict, the embodiments in the present disclosure and the features in the embodiments may be combined with each other arbitrarily.

In the drawings, a size of each component, a thickness of a layer, or a region may be exaggerated for clarity sometimes. Therefore, an aspect of the present disclosure is not necessarily limited to this size, and a shape and the size of each component in the drawings do not reflect a true ratio. In addition, the drawings schematically show ideal examples, and an aspect of the present disclosure is not limited to the shapes or numerical values shown in the drawings.

The ordinal numbers such as "first" and "second" in the present specification are set to avoid confusion of the constituent elements, rather than to limit in terms of the number.

In the present specification, for the sake of convenience, the use of words indicating an orientation or positional relationship, such as "middle area", "sides area", "above", "inside", and "outside", is for explaining the positional relationship of the constituent elements with reference to the drawings. It is only for the convenience of describing the specification and simplifying the description, rather than indicating or implying that the device or element referred to must have a specific orientation, be configured and operated in a specific orientation, and therefore cannot be understood as a limitation of the present disclosure. The positional relationship of the constituent elements is appropriately changed according to the direction in which each constituent element is described. Therefore, it is not limited to the words and sentences described in the specification, and may be changed appropriately according to the situation.

In the present specification, unless otherwise clearly defined and defined, the terms "connected" and "coupled" should be interpreted broadly. For example, it may be a fixed connection, or a detachable connection, or an integral connection; it may be a mechanical connection or an electrical connection; it may be a direct connection, or an indirect connection through an intermediate member, or a communication between two components, or integratedly formed by two parts. For those of ordinary skill in the art, the specific meaning of the above-mentioned terms in the present disclosure may be understood in specific situations.

In the present disclosure, unless otherwise specified, the term "same-layer arrangement" used means that two layers, parts, components, elements, or portions may be formed by the same patterning process, and the two layers, parts, components, elements or portions are generally formed of the same material.

In the present disclosure, unless otherwise specified, the expression "patterning process" generally includes steps of photoresist coating, exposure, development, etching, and stripping. The expression "one patterning process" means a process of forming patterned layers, parts, components, etc., using one mask.

The embodiments of the present disclosure provide a display panel that has good flexibility and is capable of being laminated to a curved cover plate. The curved cover plate may be a four-sided curved cover plate (that is, a curved cover plate with four curved sides), which is not limited to this, and it may also be a double-sided curved cover plate (i.e.: a cover plate with curved long sides). It should be understood that the entire display panel may be flat before being laminated to the curved cover plate.

As shown in FIG. 1, the display panel of the embodiments of the present disclosure may include a main display area 10 and a peripheral area disposed around the main display area 10. The peripheral area may include a first side edge area 11 extending in a first direction X, a second side edge area 12 extending in a second direction Y and a corner area 13 located between the first side edge area 11 and the second side edge area 12.

Specifically, the peripheral area of the display panel may include two first side edge areas 11 opposite to each other in the second direction Y, two second side edge areas 12 opposite to each other in the first direction X, and four corner areas 13.

It should be understood that the first direction X, second direction Y and a thickness direction Z of the display panel are perpendicular to each other.

Figure 2:
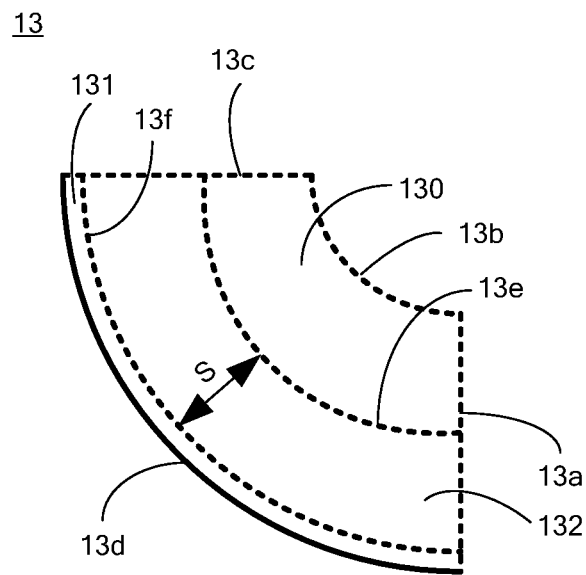
FIG. 2 is a schematic diagram illustrating a distribution of respective areas in a corner area of the display panel shown in FIG. 1.

As shown in FIG. 1, the first side edge area 11 and the second side edge area 12 may be rectangular areas, that is, orthographic projections of the first side edge area 11 and the second side edge area 12 on a reference plane may be rectangular. The corner area 13 may be an arc-shaped area, that is, an orthographic projection of the corner area 13 on the reference plane may be in an arc shape. As shown in FIG. 2, the orthographic projection of the corner area 13 on the reference plane may include a first straight side 13a, an inner arc side 13b, a second straight side 13c, and an outer arc side 13d that are connected end to end in sequence. The first straight side 13a is a side in the corner area 13 that abuts against the first side edge area 11, the second straight side 13c is a side in the corner area 13 that abuts against the second side edge area 12. The inner arc side 13b is a side in the corner area 13 that is close to the main display area 10. The outer arc side 13d is a side in the corner area 13 that is away from the main display area 10. For example, the inner arc side 13b may be a circular arc shape. When lengths of the first straight side 13a and the second straight side 13c are equal, the outer arc side 13d may also be a circular arc shape. However, the lengths of the first straight side 13a and the second straight side 13c may be equal or unequal and, accordingly, the outer arc side 13d may be circular or non-circular arc shape depending on a specific situation.

It should be noted that the orthographic projection of the corner area 13 on the reference plane may also be in a sector shape, that is, compared to the corner area 13 in arc shape mentioned above, an orthographic projection of the corner area 13 in sector shape on the reference plane does not include the inner arc side 13b, but only includes the first straight side 13a, the second straight side 13c, and the outer arc side 13d, and the first straight side 13a, the second straight side 13c, and the outer arc side 13d are connected end to end in sequence.

The reference plane mentioned in the embodiments of the present disclosure is a plane perpendicular to the thickness direction Z of the display panel.

Further, as shown in FIG. 2, the corner area 13 may further include a corner display area 130, a corner border area 131, and a corner wiring area 132 located between the corner display area 130 and the corner border area 131. The corner display area 130 is located on a side of the corner wiring area 132 close to the main display area 10, and the corner border area 131 is located on a side of the corner wiring area 132 away from the main display area 10. It should be noted that the corner wiring area 132 and the corner border area 131 may be a corner non-display area as a whole.

As shown in FIG. 2, an orthographic projection of the corner wiring area 132 on the reference plane may include a first arc side 13e adjoining the corner display area 130 and a second arc side 13f adjoining the corner border area 131. It is noted that the first arc side 13e and the second arc side 13f may have the same shape as the outer arc side 13d or the inner arc side 13b of the corner area 13; but it is not limited to this, and the shapes may also be different. For example, when the outer arc side 13d is in the shape of the circular arc, the shapes of the first arc side 13e and the second arc side 13f may also be a circular arc, and the outer arc side 13d, the first arc side 13e and the second arc side 13f are concentric.

A dimension S of the corner wiring area 132 in a radial direction of the outer arc side 13d may be 0.5 mm to 1 mm, that is, a distance between the first arc side 13e and the second arc side 13f in the radial direction of the outer arc side 13d is 0.5 mm to 1 mm, such as 0.5 mm, 0.6 mm, 0.7 mm, 0.8 mm, 0.9 mm, 1 mm, etc. It should be understood that the dimension S of the corner wiring area 132 in the radial direction of the outer arc side 13d defined here may be a range when the display panel is flat as a whole, that is, before the display panel is laminated to the curved cover plate. After the display panel is laminated to the curved cover plate, the dimension S of the corner wiring area 132 in the radial direction of the outer arc side 13d may change according to actual bending requirements.

It should be noted that the radial direction mentioned in the embodiments of the present disclosure is a direction of the radius of curvature.

It should also be noted that the first side edge area 11 and the second side edge area 12 may also include a side display area, a side wiring area, and a side border area arranged in sequence away from the main display area 10. The main display area 10, the corner display area 130, and the side display area may jointly form an entire display area of the display panel; the side wiring area and the corner wiring area 132 may jointly form an entire peripheral wiring area of the display panel; and the side border area and the corner border area 131 may jointly form an entire border area of the display panel.

In the embodiments of the present disclosure, the peripheral area of the display panel may be bent so as to be laminated to a four-sided curved cover plate.

The display panel may include a flexible base layer as well as a display function layer, a peripheral circuit layer, and a crack-proof wall formed on the flexible base layer.

The display panel of the embodiments of the present disclosure will be described in detail below with reference to the accompanying drawings.

As shown in FIGS. 3 to 6, the flexible base layer 133 implemented in the present disclosure may be a single-layer structure, but is not limited to this, and may also be a multi-layer structure. For example, the flexible base layer 133 may be made of materials such as PI (polyimide). It should be understood that the flexible base layer 133 has a top surface and a bottom surface opposite to each other in the thickness direction Z, and the top surface is used to form other film layers of the display panel.

A plurality of first openings 1330 may be provided in parts of the flexible base layer 133 located in the main display area 10 and the corner display area 130. It should be understood that the first openings 1330 penetrate through the top surface and the bottom surface of the flexible base layer 133 to further increase its flexibility. In addition, it should be noted that when the first side edge area 11 and the second side edge area 12 include side display areas, a plurality of first openings 1330 may also be provided in parts of the flexible base layer 133 located in the side display areas.

Base grooves may be provided in a part of the flexible base layer 133 located in the corner wiring area 132, so as to increase the flexibility of the corner wiring area 132 and improve its bending deformation ability. However, it is not limited to this, the flexible base layer 133 may be not provided with the base grooves.

It should be understood that when the part of the flexible base layer 133 located in the corner wiring area 132 is provided with the base grooves, the base grooves are disposed on the top surface of the flexible base layer 133 and do not penetrate the bottom surface of the flexible base layer 133. In addition, it should be noted that when the first side edge area 11 and the second side edge area 12 include side wiring areas, parts of the flexible base layer 133 located in the side wiring areas may also be provided with the base grooves. However, it is not limited to this, and the base grooves may not be provided in the side wiring areas.

Figure 4:
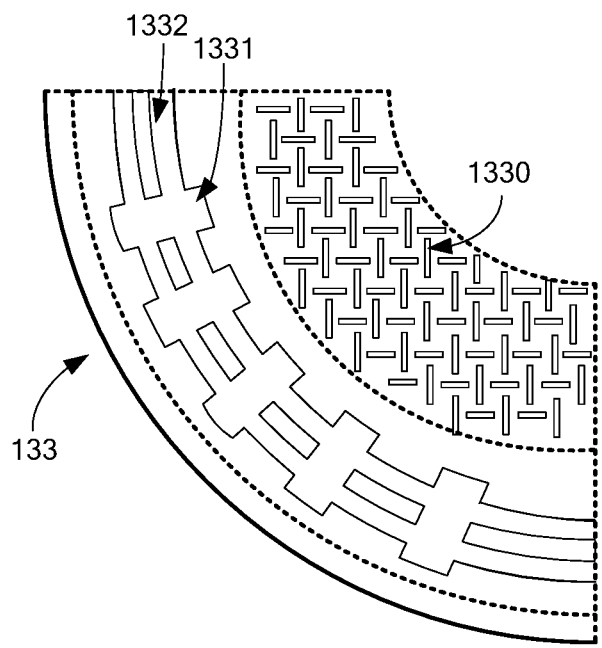
FIG. 4 is a schematic structural diagram of a flexible base layer in the corner area shown in FIG. 3.

As shown in FIG. 4, the base grooves of the embodiments of the present disclosure may include a plurality of first grooves 1331 arranged at intervals along a bending direction of the outer arc side 13d and a plurality of second groove 1332 arranged at intervals along the radial direction of the outer arc side 13d. The second grooves 1332 communicate with the first grooves 1331. The first groove 1331 extends in the radial direction of the outer arc side 13d. An orthographic projection of the second groove 1332 on the reference plane is an arc shape, and the second groove 1332 and the outer arc 13d are concentric. Such design may increase the bending deformation ability of the corner wiring area 132 in its radial and tangential directions.

Figure 5:
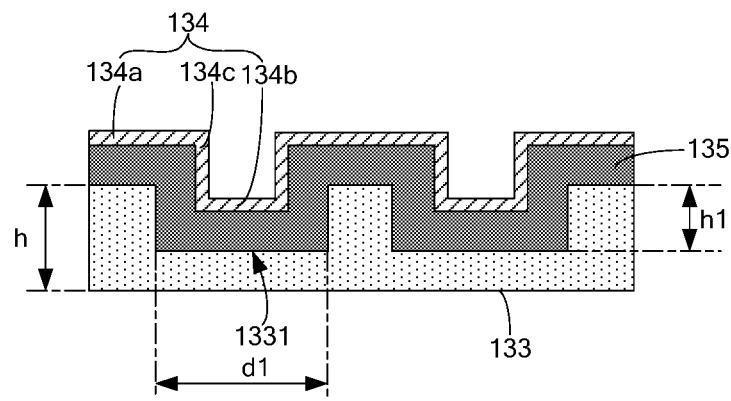
FIG. 5 is a schematic cross-sectional view of the corner area shown in FIG. 3 in a Q-Q direction.
Figure 6:
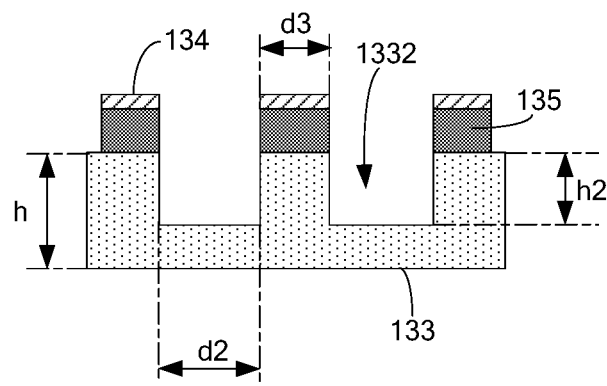
FIG. 6 is a schematic cross-sectional view of the corner area shown in FIG. 3 in a P-P direction.

As shown in FIGS. 5 and 6, a depth h1 of the first groove 1331 and a depth h2 of the second groove 1332 are 25% to 75% of a thickness h of the flexible base layer 133. The depth and thickness mentioned here are dimensions in the thickness direction Z, so that the bending deformation ability of the corner wiring area 132 may be increased while ensuring structural stability of the flexible base layer 133.

For example, the thickness h of the flexible base layer 133 may be 5 μm to 20 μm, such as 5 μm, 10 μm, 15 μm, 20 μm, etc., then the depth h1 of the first groove 1331 and the depth h2 of the second groove 1332 may be 1.25 μm to 15 μm, such as 1.25 μm, 3.75 μm, 5 μm, 15 μm and so on. It should be understood that the thickness range of the flexible base layer 133 and the depth range of the first groove 1331 and the second groove 1332 defined here may be the value range when the display panel is flat as a whole, that is, before the display panel is laminated to the curved cover plate; and after the display panel is laminated to the curved cover plate, the thickness of the flexible base layer 133, the depths of the first groove 1331 and the second groove 1332 may change according to the actual bending requirements.

It should be noted that the depths of the first groove 1331 and the second groove 1332 may be the same, but are not limited to this, and may also be designed to be different, depending on the specific situation. A distance between adjacent first grooves 1331 may be equal to a width d1 of the first groove 1331; and a distance between adjacent second grooves 1332 may be equal to a width d2 of the second groove 1332.

In addition, it should also be noted that the width d1 of the first groove 1331 is a dimension in a direction perpendicular to the extending direction of the first groove 1331; the width d2 of the second groove 1332 is a dimension thereof in the radial direction of the outer arc side 13d.

The display function layer implemented in the present disclosure may be located in the main display area 10 and the corner display area 130. It should be understood that when the first side edge area 11 and the second side edge area 12 include side display areas, the display function layer may also be located in the side display areas. Accordingly, it may be understood that the display function layer is located in the entire display area of the display panel.

Since the flexible base layer 133 is provided with the first openings 1330, the display function layer manufactured on the flexible base layer 133 may naturally be formed with second openings corresponding to the first openings 1330. The second openings penetrate the entire display function layer in the thickness direction Z. It should be noted that the first openings 1330 on the flexible base layer 133 and the second openings on the display function layer may also be formed by wholly punching holes in the display panel after the display panel being manufactured, depending on the specific situation. In addition, when the parts of the flexible base layer 133 located in the main display area 10, the corner display area 130 and the side display area are provided with multiple first openings 1330, the parts of the display function layer located in the main display area 10, the corner display area 130 and the side display area are also provided with multiple second openings.

Figure 3:
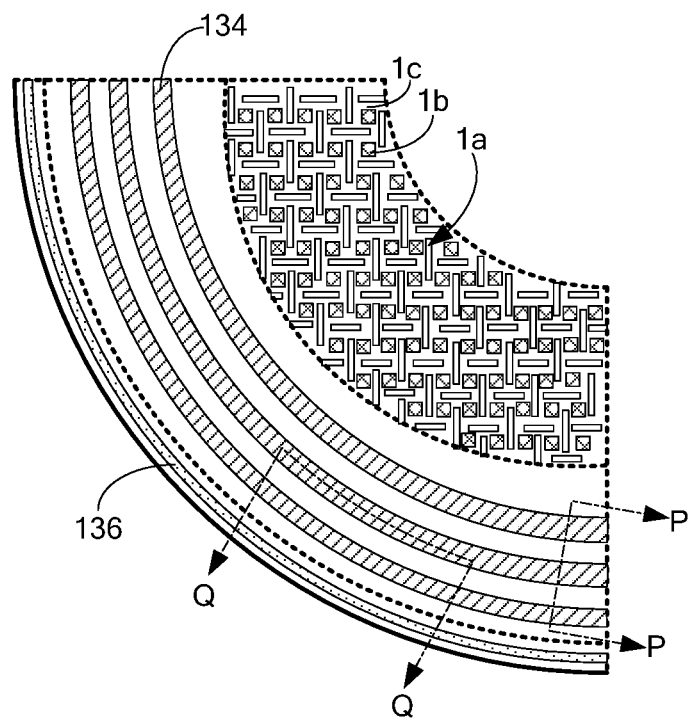
FIG. 3 is a schematic structural diagram of the corner area shown in FIG. 2.

An orthographic projection of the second opening on the flexible base layer 133 may completely coincide with the first opening 1330. The first opening 1330 and the second opening may be jointly formed as a through hole 1a that penetrates through the entire display panel, as shown in FIG. 3. In other words, the display panel may be provided with the through hole 1a, and the through hole 1a includes the first opening 1330 located in the flexible base layer 133 and the second opening located in the display function layer.

For example, the parts of the display panel in the main display area 10, the corner display area 130, and the side display area each are provided with multiple through holes 1a, and each of the through holes 1a may be an elongated hole in a shape of a Chinese character "一", or a hole in a shape of a Chinese character "工" composed of multiple elongated holes "一". When the display panel is not laminated to the curved cover plate, the shapes, and sizes of the through holes 1a located in the main display area 10, the corner display area 130, and the side display area may be the same.

Figure 7:
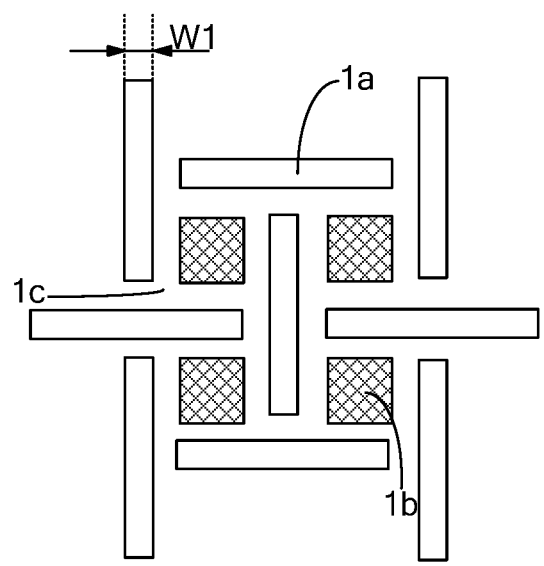
FIG. 7 is a partial schematic diagram of a main display area, a first sub-area, or a second sub-area in a display panel according to an embodiment of the present disclosure.

As shown in FIGS. 3 and 7, multiple through holes 1a define pixel islands 1b for display and bridges 1c for signal transmission. A plurality of signal wires for signal transmission are included within the bridge 1c. A plurality of pixels, such as red (R) pixels, green (G) pixels, blue (B) pixels, etc., may be included within each pixel island 1b, and each pixel may include a display device, which may be an OLED display. The display device may be electrically connected with the signal wire to emit light and display. For example, the display device may include a driving transistor, an anode, an organic light-emitting material layer, a cathode, and so on.

In addition, the display function layer may further include an inorganic insulating layer, an organic insulating layer, etc., which will not be described in detail here.

In the embodiments of the present disclosure, as shown in FIG. 3 and FIG. 7, multiple through holes 1a are disposed around the pixel island 1b, and a part of the bridge 1c is located between the pixel island 1b and the through hole 1a, and the other part is located between adjacent through holes 1a. In the embodiments of the present disclosure, the plurality of through holes 1a designed to be around the pixel islands 1b are disposed in the entire display area of the display panel, so that elastic modules of the display panel in various directions are small and substantially the same. Therefore, it is ensured that the display panel has good stretching and bending deformation ability in various directions.

It should be noted that PPI (Pixels Per Inch, that is, pixel density) of the display panel of the embodiments of the present disclosure may reach at least 200.

As shown in FIG. 3, the peripheral circuit layer implemented in the present disclosure may be located in the corner wiring area 132. When the first side edge area 11 and the second side edge area 12 include side wiring areas, the peripheral circuit layer may also be located in the side wiring area. That is, the peripheral circuit layer may be located in the entire peripheral wiring area of the display panel. Specifically, the peripheral circuit layer may include one or more peripheral wirings 134. For example, the peripheral wirings 134 may be disposed in the same layer as the signal wirings of the entire display area of the display panel or the source and drain electrodes of the driving transistors.

In the embodiments of the present disclosure, the orthographic projection of at least a part of the peripheral wiring 134, in the corner wiring area 132, on the flexible base layer 133 are located in the base groove. The orthographic projection of the peripheral wiring 134 located in the corner wiring area 132 on the reference plane may be an arc, and concentric with the outer arc 13d, but is not limited to this.

When the base groove of the flexible base layer 133 is composed of the first groove 1331 and the second groove 1332, as shown in FIGS. 3 to 6, a part of the peripheral wiring 134 in the embodiments of the present disclosure is located between the adjacent second grooves 1332. Specifically, the peripheral wiring 134 located in the corner area 13 is located between adjacent second grooves 1332 as a whole, and a part of the peripheral wiring 134 may be located in the first grooves 1331, and other parts of the peripheral wiring 134 may be located outside the first grooves 1331.

Specifically, the peripheral wiring 134 located in the corner wiring area 132 may have a first segment 134a, a second segment 134b, and a transition segment 134c connecting the first segment 134a and the second segment 134b. The first segment 134a is located between adjacent first grooves 1331 (i.e., located outside the first groove 1331), and the second segment 134b and the transition segment 134c are located in the first groove 1331.

Since the flexible base layer 133 located in the corner wiring area 132 is provided with the base grooves stated above, the flexible base layer 133 located in the corner wiring area 132 has a height difference. When the peripheral wiring 134 is formed on the flexible base layer 133 with the height difference, the peripheral wiring 134 may also have a height difference along with the height difference on the flexible base layer 133. It should be noted that the peripheral wiring 134 may be an integrated structure.

A ratio of the width d1 of the first groove 1331 to a width d3 of the peripheral wiring 134 may be 1 to 50, such as 1, 10, 25, 40, 50, and so on. A ratio of the width d2 of the second groove 1332 to the width d3 of the peripheral wiring 134 may be 1 to 15, such as 1, 5, 10, 15 and so on. It should be understood that a range of the ratio of the width d1 of the first groove 1331 to the width d3 of the peripheral wiring 134, and a range of the ratio of the width d2 of the second groove 1332 to the width d3 of the peripheral wiring 134 defined here may be the value range when the display panel as a whole is flat, that is, before the display panel is laminated to the curved cover plate. After the display panel is laminated to the curved cover plate, the ratio of the width d1 of the first groove 1331 to the width d3 of the peripheral wiring 134, and the ratio of the width d2 of the second groove 1332 to the width d3 of the peripheral wiring 134 may change according to actual bending requirements.

For example, the width d1 of the first groove 1331 may be 10 μm to 100 μm, such as 10 μm, 30 μm, 50 μm, 70 μm, 100 μm, etc. The width d2 of the second groove 1332 may be 2 μm to 30 μm, such as 2 μm, 10 μm, 20 μm, 30 μm, etc. The width d3 of the peripheral wiring 134 may be 2 μm to 10 μm, such as 2 μm, 5 μm, 8 μm, 10 μm, etc. It should be noted that the width of the peripheral wiring 134 is a dimension in the radial direction of the outer arc side 13d.

It should be understood that the value ranges of the width d1 of the first groove 1331, the width d2 of the second groove 1332, and the width d3 of the peripheral wiring 134 defined here may be the value ranges when the display panel is flat as a whole, that is, before the display panel is laminated to the curved cover plate. After the display panel is laminated to the curved cover plate, the width d1 of the first groove 1331, the width d2 of the second groove 1332, and the width d3 of the peripheral wiring 134 may change according to actual bending requirements.

In addition, the peripheral circuit layer implemented in the present disclosure may further include a peripheral insulating portion 135, which may be located between the flexible base layer 133 and the peripheral wiring 134. That is, during a manufacturing process of the display panel, after the flexible base layer 133 is manufactured, the peripheral insulating portion 135 may be manufactured first followed by manufacturing the peripheral wiring 134. A part of the peripheral insulating portion 135 may be located between adjacent first grooves 1331, and the other part may be located in the first groove 1331. Further, the peripheral insulating portion 135 is located between adjacent second grooves 1332. Specifically, the entire peripheral insulating portion 135 is located between adjacent second grooves 1332.

For example, the peripheral insulating portion 135 may be disposed in the same layer as at least a part of the inorganic insulating layers (for example, a buffer layer, a gate insulating layer, a passivation layer, etc.) of the entire display area of the display panel.

The crack-proof wall 136 implemented in the present disclosure may be located in the corner border area 131. When the first side edge area 11 and the second side edge area 12 include side edge areas, the crack-proof wall 136 may also be located in the side edge area. In other words, the crack-proof wall 136 may be located on the entire edge area of the display panel, and the crack-proof wall 136 surrounds the entire display area of the display panel, and is used to prevent cracks occurred during cutting the display panel from the template from extending to the display area, thereby ensuring the product quality. There may be provided with multiple rounds of crack-proof wall 136.

For example, the crack-proof wall 136 may be disposed in the same layer as at least a part of the inorganic insulating layers (for example, a buffer layer, a gate insulating layer, a passivation layer, etc.) of the entire display area of the display panel.

Figure 12:
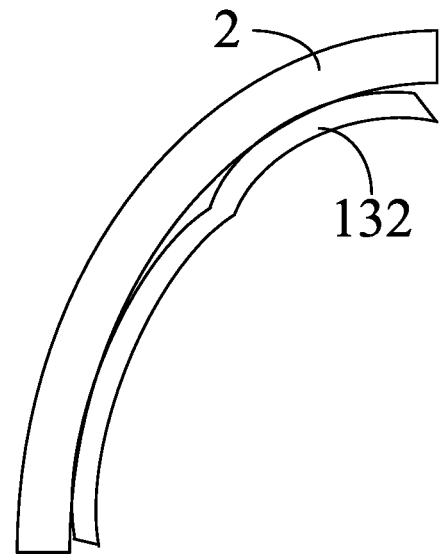
FIG. 12 is a schematic diagram illustrating a state after a corner wiring area with a base groove provided by an embodiment of the present disclosure being laminated to a curved cover plate.
Figure 13:
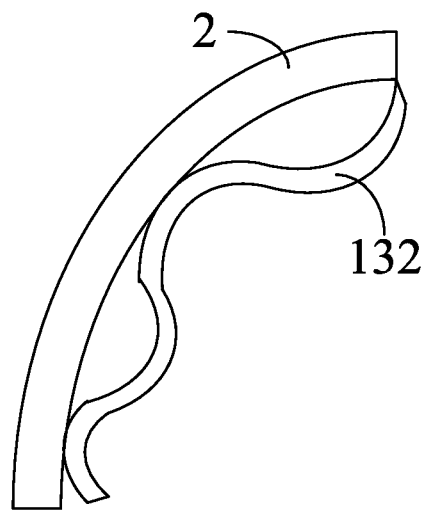
FIG. 13 is a schematic diagram illustrating a state after a corner wiring area without a base groove in a display panel in the related art being laminated to a curved cover plate.

Specifically, FIG. 12 is a schematic diagram illustrating a state after a corner wiring area 132 with base grooves provided by an embodiment of the present disclosure being laminated to the curved cover plate 2. FIG. 13 is a schematic diagram illustrating a state after a corner wiring area 132 without a base groove in a display panel in the related art being laminated to the curved cover plate 2. As can be seen from the cooperation between FIG. 12 and FIG. 13, the embodiments of the present disclosure may reduce the overall elastic modulus of the corner wiring area 132 by disposing the base grooves in the portion of the flexible base layer 133 located in the corner wiring area 132. In this way, when the display panel is laminated to the curved cover plate, in particular the four-sided curved cover plate, the corner wiring area 132 may bend under stress to reduce wrinkles in the corner wiring area 132, and to further alleviate a stress concentration phenomenon at the corner wiring area 132. Therefore, display failure, caused since the peripheral wiring 134 is easily broken, is prevented.

The embodiments of the present disclosure further provide a display device that includes a curved cover plate and a display panel laminated to the curved cover plate. The display panel may be flat when being not laminated to the curved cover plate, and reference may be made to the structure described in any of the foregoing embodiments for details. After the display panel is laminated to the curved cover plate, the display panel may be substantially in the same curved shape as the curved cover plate.

For example, the curved cover plate may be a four-sided curved cover plate, that is, the curved cover plate may include a central area and an edge area surrounding the central area. The central area may be flat, but is not limited to this. The edge area may include a first cambered surface area, a second cambered surface area adjacent to the first cambered surface area, and a corner spherical surface area between the first cambered surface area and the second cambered surface area. There are two first cambered surface areas, and the first cambered surface area extends in the first direction X. There are two second cambered surface areas, and the second cambered surface area extends in the second direction Y. There are four corner spherical surface areas. It should be noted that the curved cover plate is not limited to the shape mentioned above, and may also be other shapes, for example, only a pair of adjacent two sides in the edge area are curved.

For example, the radius of curvature of the first cambered surface area, the second cambered surface area and the corner spherical surface area in the curved cover plate of the embodiments of the present disclosure may be 5 mm to 10 mm, such as 5 mm, 6 mm, 7 mm, 8 mm, 9 mm, 10 mm and so on, but not limited to this, it may also be other values.

The main display area 10, the first side edge area 11, the second side edge area 12, and the corner area 13 of the aforementioned flat display panel are correspondingly laminated to the central area, the first cambered surface area, the second arc area and the corner spherical surface area of the curved cover plate, respectively. After the aforementioned flat display panel and the curved cover plate are conformally laminated, the main display area 10 of the display panel may be flat, and the first side edge area 11 and the second side edge area 12 of the display panel may be curved in an arc shape, and the corner area 13 of the display panel may be curved in a spherical shape as a whole.

As mentioned above, the through holes 1a are disposed in the entire display area of the display panel, so that the display panel has good deformability, thereby alleviating the wrinkle phenomenon occurred in the corner area 13 during laminating the display panel to the curved cover plate.

After the aforementioned flat display panel is laminated to the curved cover plate, the structure of the corner area 13 of the display panel changed compared to that before being laminated to the curved cover plate.

Figure 8:
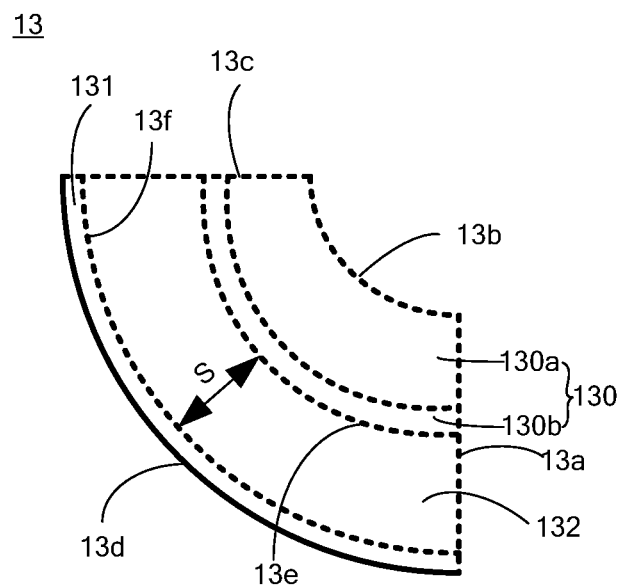
FIG. 8 is a schematic diagram illustrating another distribution of respective areas in a corner area of the display panel shown in FIG. 1.
Figure 9:
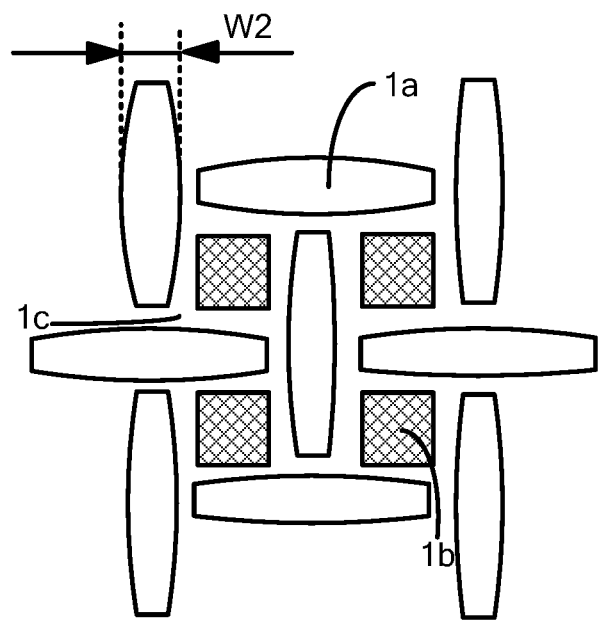
FIG. 9 is a partial schematic diagram illustrating a first sub-area after a curved cover plate is laminated to a display panel according to an embodiment of the present disclosure.
Figure 10:
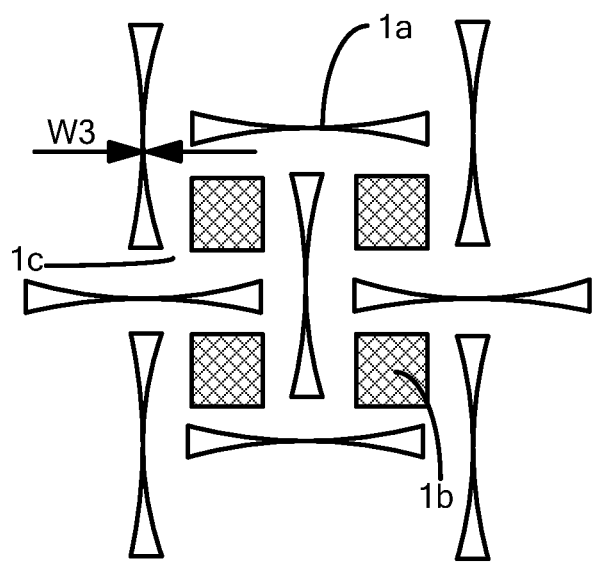
FIG. 10 is a partial schematic diagram illustrating a second sub-area after a curved cover plate is laminated to a display panel according to an embodiment of the present disclosure.

As shown in FIG. 8, the corner display area 130 of the display panel in the embodiments of the present disclosure has a first sub-area 130a close to the main display area 10 and a second sub-area 130b away from the main display area 10. Both of the first sub-area 130a and the second sub-areas 130b have the through holes 1a penetrating through the display panel, and both of the first sub-area 130a and the second sub-areas 130b are provided with multiple through holes 1a that are disposed around the pixel islands 1b. As shown in FIG. 7, four through holes 1a may be distributed around each pixel island 1b, and extending directions of adjacent through holes 1a around each pixel island 1b are perpendicular to each other. After the display panel is laminated to the curved cover plate, the first sub-area 130a is stretched, and accordingly, an opening area of the through hole 1a becomes larger than that before the display panel is laminated to the curved cover plate, as shown in FIG. 9. On the other hand, the second sub-area 130b is compressed, and an opening area of the through-hole 1a thereof is smaller than that before the display panel is laminated to the curved cover plate, as shown in FIG. 10.

As mentioned above, when the display panel is not laminated to the curved cover plate, the shapes, and dimensions (width, length) of the through holes 1a located in the main display area 10, the corner display area 130, and the side display area are the same. Therefore, after the display panel is laminated to the curved cover plate, it may be understood that the opening area of the through holes 1a in the first sub-area 130a is larger than that of the through holes 1a in the main display area 10, and the opening area of the through holes 1a in the second sub-area 130b is smaller than that of the through holes 1a in the main display area 10.

In the embodiments of the present disclosure, by disposing the plurality of through holes 1a in the first sub-area 130a and the second sub-area 130b of the corner display area 130, the first sub-area 130a may have good stretching ability and the second sub-area 130b may have good compressibility, thereby alleviating the wrinkle phenomenon occurred during laminating the display panel to the curved cover plate.

The through hole 1a as an elongated hole in the shape of the Chinese character "—" is taken as an example, as shown in FIG. 1, when the display panel is not laminated to the curved cover plate, the first and second widths of the through hole 1a may be 10 μm to 30 μm, such as 10 μm, 15 μm, 20 μm, 25 μm, 30 μm, etc.; a length of the through hole 1a in its extending direction may be 200 μm to 1000 μm, such as 200 μm, 400 μm, 600 μm, 800 μm, 1000 μm, etc.

It should be noted that the first width mentioned in the present disclosure is a width at a center of the through hole 1a, and the second width is a width at the broader of the through hole 1a in the extending direction. In addition, it should also be noted that when the display panel is not laminated to the curved cover plate, the through hole 1a has the same width across the extending direction, that is, the first width and the second width of the through hole 1a may be the same.

After the display panel is laminated to the curved cover plate, the first width of the through hole 1a in the first sub-area 130a and the first width of the through hole 1a in the second sub-area 130b may greatly change, so that areas of the through hole 1a in the first sub-area 130a and the through hole 1a in the second sub-area 130b change greatly. It should be noted that after the display panel is laminated to the curved cover plate, the length of the through hole 1a does not change substantially. Therefore, in the embodiments of the present disclosure, a change in the length of the through hole 1a is not used to consider the change in the area of the through hole 1a, and only a change in the width of the through hole 1a is used to consider the change in the area of the through hole 1a.

Before the display panel is laminated to the curved cover plate, the first width of the through hole 1a in the main display area 10, the first sub-area 130a, and the second sub-area 130b may be W1, as shown in FIG. 7. After the display panel is laminated to the curved cover plate, the first width of the through hole 1a in the first sub-area 130a may be W2, as shown in FIG. 9; the first width of the through hole 1a in the second sub-area 130b may be W3, as shown in FIG. 10. A ratio of W2 to W1 is 1.1 to 1.5, that is, the width of the through hole 1a of first sub-area 130a in the display panel is increased by 10% to 50% compared to that before the display panel is laminated to the curved cover plate. A ratio of W3 to W1 is greater than or equal to 0, and less than 1. For example, when W1 is 20 μm, W2 may be 22 μm to 30 μm, such as 22 μm, 24 μm, 26 μm, 28 μm, 30 μm and so on, and W3 is greater than or equal to 0 and less than 20 μm.

In addition, after the display panel is laminated to the curved cover plate, a ratio of the second width of the through hole 1a in the first sub-area 130a to the second width of the through hole 1a in the main display area 10 is 0.8 to 1.2, such as 0.8, 1, 1.2 and so on, and a ratio of the second width of the through hole 1a in the second sub-area 130b to the second width of the through hole 1a in the main display area 10 is 0.8 to 1.2, such as 0.8, 1, 1.2 and so on.

It should be noted that after the display panel is laminated to the curved cover plate, in the extending direction of the through hole 1a, the width of the through hole 1a in the first sub-area 130a gradually increases from the broader to the center, as shown in FIG. 9. After the display panel is laminated to the curved cover plate, in the extending direction of the through hole 1a, the width of the through hole 1a in the second sub-area 130b gradually decreases from the broader to the center.

It should also be noted that after the display panel is laminated to the curved cover plate, the width of the through hole 1a in the main display area 10 is substantially unchanged.

In addition, by disposing multiple through holes 1a in the first sub-area 130a and the second sub-area 130b of the corner display area 130, the stretching deformation ability of the corner area 13 of the display panel is improved. In this way, after the display panel is laminated to the curved cover plate, the overall area of the corner area 13 in the display panel becomes larger than that before the display panel is laminated to the curved cover plate, so that the display panel is better laminated to the curved cover plate, thereby alleviating the wrinkle phenomenon occurred during laminating the display panel to the curved cover plate.

Figure 11:
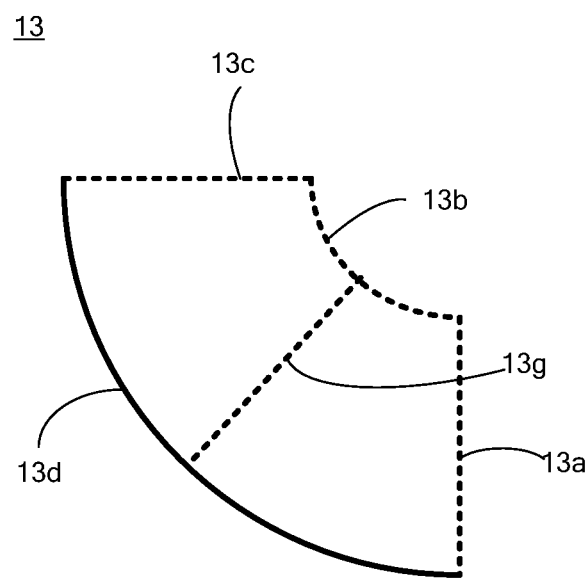
FIG. 11 is a schematic diagram illustrating a position where a middle edge of a corner area of the display panel shown in FIG. 1 is located.

Specifically, after the display panel is laminated to the curved cover plate, the first straight side 13a, the second straight side 13c, and the middle side 13g of the corner area 13 of the display panel (as shown in FIG. 11) have a certain elongation deformation compared to those before the display panel is laminated to the curved cover plate. It should be noted that the middle side 13g mentioned here is a side in the corner area 13 that extends in the radial direction of the inner arc side 13b, passes through the center of the corner area 13, and two ends of the middle side 13g are connected to the inner arc side 13b and the outer arc side 13d respectively.

Before the display panel is laminated to the curved cover plate, in the corner area 13 of the display panel, the length of the first straight side 13a is A, the length of the second straight side 13c is B, and the length of the middle side 13g is C. After the display panel is laminated to the curved cover plate, in the corner area 13 of the display panel, the length of the first straight side 13a is A1, the length of the second straight side 13c is B2, and the length of the middle side 13g is C2. A ratio of A1 to A, a ratio of B1 to B, and a ratio of C1 to C may be 1.005 to 1.05. That is, after the display panel is laminated to the curved cover plate, the length of the first straight side 13a of the corner area 13 in the display panel has an elongation of 0.5% to 5% compared to that before the display panel is laminated to the curved cover plate; the length of the second straight side 13c of the corner area 13 in the display panel has an elongation of 0.5% to 5% compared to that before the display panel is laminated to the curved cover plate; and the length of the middle side 13g of the corner area 13 in the display panel has an elongation of 0.5% to 5% compared to that before the display panel is laminated to the curved cover plate.

In the embodiments of the present disclosure, since the length of the first straight side 13a, the length of the second straight side 13c, and the length of the middle side 13g of the corner area 13 in the display panel have the above elongation, the corner area 13 of the display panel may have a relatively large elongation deformation. Therefore, the corner area 13 of the display panel may be better laminated to the curved cover plate, thereby alleviating the wrinkle phenomenon occurred during laminating the display panel to the curved cover plate.

In addition, after the display panel is laminated to the curved cover plate, the outer arc side 13d of the corner area 13 in the display panel may be compressed or stretched a certain extent.

Before the display panel is laminated to the curved cover plate, an arc length of the outer arc side 13d of the corner area 13 in the display panel is L. After the display panel is laminated to the curved cover plate, the arc length of the outer arc side 13d of the corner area 13 in the display panel is L1. A ratio of L1 to L may be greater than or equal to 90%.

It should be noted that when the ratio of L1 to L is greater than or equal to 90% and less than 100%, it means that after the display panel is laminated to the curved cover plate, the outer arc side 13d of the corner area 13 of the display panel may be in a compressed state, and has an compression less than 10%. When the ratio of L1 to L is greater than 100%, it means that after the display panel is laminated to the curved cover plate, the outer arc side 13d of the corner area 13 in the display panel may be in a stretching state.

It should be noted that the radius of curvature of the first cambered surface area, the second cambered surface area and the corner spherical surface area in the curved cover plate mentioned above may be 5 mm to 10 mm. In this embodiment, after the display panel is laminated to the curved cover plate, the length of the first straight side 13a, the length of the second straight side 13c, and the length of the middle side 13g of the corner area 13 in the display panel may be 2 mm to 7 mm, such as 2 mm, 3 mm, 4 mm, 5 mm, 6 mm, 7 mm and so on; the length of the outer arc side 13d is 10 mm to 15 mm, such as 10 mm, 11 mm, 12 mm, 13 mm, 14 mm, 15 mm and so on, without being limited to this.

A set of experiments shows that before the display panel of the embodiments of the present disclosure is laminated to the curved cover plate, in the corner area 13 of the display panel, the length A of the first straight side 13a may be 5.1 mm, and the length B of the second straight side 13c may be 5.55 mm, and the length C of the middle side 13g may be 4.03 mm. At this time, the arc length L of the outer arc side 13d of the corner area 13 may be 12.10 mm, and the area of the corner area 13 may be 36.89 mm$^2$.

As an example, assuming that an example in which the length of the first straight side 13a, the length of the second straight side 13c, and the length of the middle side 13g of the corner area 13 have an elongation of 3% after the display panel of the embodiments of the present disclosure is laminated to the curved cover plate, then after the display panel of the embodiments of the present disclosure is laminated to the curved cover plate, in the corner area 13 of the display panel, the length A1 of the first straight side 13a may be 5.25 mm, and the length B1 of the second straight side 13c may be 5.72 mm, and the length C1 of the middle 13g may be 4.15 mm. At this time, the arc length L1 of the outer arc side 13d of the corner area 13 may be 12.15 mm, and the area of the corner area 13 may be 39.12 mm$^2$. A compression ratio of the outer arc side 13d after lamination may be −0.4%, and a calculation formula of the compression ratio is: (L−L1)/L. It should be noted that if the compression ratio is negative, it means that the outer arc side 13d after lamination is in a stretched state; a positive compression ratio indicates that the outer arc side 13d after lamination is in a compressed state.

It may be seen that after the display panel of the embodiments of the present disclosure is laminated to the curved cover plate, the area of the corner area 13 is increased compared to that before the display panel is laminated to the curved cover plate, that is, the entire corner area 13 after lamination may be in a stretched state. Further, the arc length of the outer arc side 13d is also increased, that is, the outer arc side 13d after lamination may be in a stretched state. In this way, the wrinkle phenomenon in the corner area 13 after the display panel is laminated to the curved cover plate can be alleviated.

It may be known from another set of experiments that the display panel in the related art does not have the through hole 1a mentioned in the embodiments of the present disclosure, nor does it have the base groove mentioned in the foregoing embodiments. It should be noted that such display panel does not have the stretching and compression ability, or has the weak stretching and compression ability. Before the display panel with poor stretching and compression ability is laminated to the curved cover plate, in the corner area 13 of the display panel, the length of the first straight side 13a may be 5.1 mm, the length of the second straight side 13c may be 5.55 mm, and the length of the middle side 13g may be 4.03 mm. At this time, the arc length of the outer arc side 13d of the corner area 13 may be 12.10 mm, and the area of the corner area 13 may be 36.89 mm$^2$. After the display panel with poor stretching and compression ability is laminated to the curved cover plate, the length of the first straight side 13a, the second straight side 13c, and the middle side 13g of the corner area 13 in the display panel remain substantially unchanged, but at this time, the arc length of the outer arc side 13d of the corner area 13 needs to be compressed to 11.94 mm theoretically, that is, the compression ratio of the outer arc side 13d after lamination may be 1.3%. Further, the area of the corner area 13 needs to be compressed to 36.77 mm$^2$. However, due to the poor stretching and compressive ability of this display panel, larger wrinkles will occur, which will affect product performance.

As may be known from the above two sets of experiments, in the embodiments of the present disclosure, the through holes 1a are disposed in the corner area 13 of the display panel, so that the corner area 13 may be stretched and deformed, thereby alleviating the wrinkle phenomenon in the corner area 13.

The display device of the embodiments of the present disclosure may further include an optical film and a protective back film which have good flexibility. The optical film may be located on a side of the display panel facing the curved cover plate, and the protective back film may be located on a side of the display panel away from the curved cover plate.

In the embodiments of the present disclosure, a specific type of the display device is not particularly limited, and all types of display devices commonly used in the art may be used, such as mobile phones, tablets, watches, etc., and those skilled in the art may make a corresponding selection according to the specific purpose of the display device, and it will not be repeated here.

It should be noted that, in addition to the display panel, the display device also includes other necessary components. Taking a display as an example, specifically, the display may include for example a housing, a circuit board, a power wire etc. Those skilled in the art may make corresponding supplements according to the specific usage requirements of the display device, which will not be repeated here.

The embodiments of the present disclosure further provide a manufacturing method of a display device including steps described below.

In step S100, a curved cover plate is provided. It should be understood that the curved cover plate may be the four-sided curved cover plate described in the foregoing embodiments, and will not be described in detail here.

In step S102, a display panel is provided. The display panel is the flat display panel described in any of the foregoing embodiments, and will not be described in detail here.

In step S104, the display panel is laminated to the curved cover plate.

It should be noted that, after the display panel is laminated to the curved cover plate, the display panel may refer to the structure described in any of the foregoing embodiments, which will not be repeated here.

In an embodiment, step S104 may specifically include: laminating the main display area 10 of the display panel to a central area of the curved cover plate; then moving the peripheral area of the display panel to approach a broader area of the curved cover plate, so that the peripheral area of the display panel is laminated to the broader area of the curved cover plate, that is, the first side edge area 11, the second side edge area 12, and the corner area 13 of the display panel are laminated to the first cambered surface area, the second cambered surface area and the corner spherical surface area of the curved cover plate, respectively.

In another embodiment, step S104 may specifically include: stretching the corner area 13 of the display panel first, and an elongation of the corner area 13 is 0.5% to 5%; it should be noted that at this time, the first side edge area 11 and the second side edge area 12 may also have a certain elongation, and the elongation of the first side edge area 11 and the second side edge area 12 is less than the elongation of the corner area 13; and then laminating the main display area 10, the first side edge area 11 and the second side edge area 12 of the stretched display panel to the curved cover plate, that is, the main display area 10, the first side edge area 11 and the second side edge area 12 of the stretched display panel are laminated to the central area, the first cambered surface area and the second cambered surface area of the curved cover plate, respectively; then stretching the corner non-display area of the display panel to approach an outer contour line of the curved cover plate, so that the corner non-display area is laminated to the curved cover plate, that is, the corner non-display area is laminated to the edge part of the corner spherical surface area in the curved cover plate away from the center area; and laminating the corner display area 130 of the display panel to the curved cover plate after the corner non-display area is laminated to the curved cover plate, that is, the corner display area 130 is laminated to the edge part of the corner spherical surface area in the curved cover plate close to the center area to complete the lamination of the display panel to the curved cover plate. At this time, the elongation of the corner area 13 is 0.5% to 5%.

It should be understood that the overall elongation of the corner area 13 after the display panel is laminated to the curved cover plate is greater than that of the corner area 13 before the display panel is laminated to the curved cover plate Other embodiments of the present disclosure will be apparent to those ordinary skilled in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

What is claimed is:
1. A display device, comprising:
a curved cover plate and a display panel laminated to the curved cover plate;
a main display area and a peripheral area surrounding the main display area, wherein the peripheral area comprises a first side edge area extending in a first direction, a second side edge area extending in a second direction, and a corner area located between the first side edge area and the second side edge area;

wherein the corner area comprises a corner display area and a corner non-display area located on a side of the corner area away from the main display area; and the corner display area comprises a first sub-area close to the main display area and a second sub-area area away from the main display area;

wherein the main display area, the first sub-area, and the second sub-area each comprise a plurality of through holes penetrating through the display panel, and the plurality of through holes define pixel islands for display and bridges for signal transmission;

wherein the plurality of through holes are disposed around the pixel islands; a part of each of the bridge is located between the pixel island and the through hole, and the other part of the bridge is located between adjacent through holes, and wherein an opening area of the through holes in the first sub-area is larger than an opening area of the through holes in the main display area, an opening area of the through holes in the second sub-area is smaller than the opening area of the through holes in the main display area, and a ratio of a first width of the through holes in the first sub-area to a first width of the through holes in the main display area is 1.1 to 1.5; a ratio of a first width of the through holes in the second sub-area to the first width of the through holes in the main display area is greater than 0 and less than 1, or equal to 0, wherein the first width is a width of the through hole at a center of the through hole.

2. The display device according to claim 1, wherein each of the pixel islands is surrounded by four through holes.

3. The display device according to claim 2, wherein the through holes comprise one or more elongated holes.

4. The display device according to claim 3, wherein the through holes are elongated holes.

5. The display device according to claim 4, wherein:
a ratio of a second width of the through holes in the first sub-area to a second width of the through holes in the main display area is 0.8 to 1.2;
a ratio of a second width of the through holes in the second sub-area to the second width of the through holes in the main display area is 0.8 to 1.2; and
the second width is a width of the through hole at a broader in an extending direction of the through hole.

6. The display device according to claim 5, wherein the first width and the second width of the through holes in the main display area are 10 μm to 30 μm.

7. The display device according to claim 1, wherein an area of the corner area after the display panel being laminated to the curved cover plate is larger that an area of the corner area before the display panel is laminated to the curved cover plate.

8. The display device according to claim 7, wherein:
an orthographic projection of the corner area on a reference plane comprises: a first straight side adjoining the first side edge area; and a second straight side adjoining the second side edge area, wherein the reference plane is perpendicular to a thickness direction of the display panel; and
compared to the first straight side and the second straight side of the corner area before the display panel being laminated to the curved cover plate, the first straight side and the second straight side of the corner area after the display panel being laminated to the curved cover plate have an elongation of 0.5% to 5%.

9. The display device according to claim 8, wherein the orthographic projection of the corner area on the reference plane further comprises an outer arc side, and the outer arc side is connected to the first straight side and the second straight side, wherein compared to the outer arc side before the display panel being laminated to the curved cover plate, the outer arc side after the display panel being laminated to the curved cover plate has a compression less than 10%.

10. The display device according to claim 9, wherein a length of the outer arc side is 10 mm to 15 mm.

11. A display panel, comprising:
a main display area and a peripheral area surrounding the main display area;
wherein the peripheral area comprises a first side edge area extending in a first direction, a second side edge area extending in a second direction, and a corner area located between the first side edge area and the second side edge area;
wherein the corner area comprises a corner display area and a corner non-display area located on a side of the corner area away from the main display area, and the corner display area comprises a first sub-area close to the main display area and a second sub-area area away from the main display area;
wherein the main display area, the first sub-area, and the second sub-area each comprise a plurality of through holes penetrating through the display panel, and the plurality of through holes define pixel islands for display and bridges for signal transmission;
wherein the plurality of through holes are disposed around the pixel islands; a part of each of the bridge is located between the pixel island and the through hole, and the other part of the bridge is located between adjacent through holes, and
wherein an opening area of the through holes in the first sub-area is larger than an opening area of the through holes in the main display area, an opening area of the through holes in the second sub-area is smaller than the opening area of the through holes in the main display area, and a ratio of a first width of the through holes in the first sub-area to a first width of the through holes in the main display area is 1.1 to 1.5 a ratio of a first width of the through holes in the second sub-area to the first width of the through holes in the main display area is greater than 0 and less than 1, or equal to 0, wherein the first width is a width of the through hole at a center of the through hole.

12. The display panel according to claim 11, wherein each of the pixel islands is surrounded by four through holes.

13. The display panel according to claim 11, wherein the through holes comprise one or more elongated holes.

14. The display panel according to claim 11, wherein a width of the through holes is 10 μm to 30 μm.

15. A method of manufacturing a display device, comprising:
providing a curved cover plate;
providing a flat display panel, wherein the display panel comprises:
a main display area and a peripheral area surrounding the main display area, and the peripheral area comprises a first side edge area extending in a first direction, a second side edge area extending in a second direction, and a corner area located between the first side edge area and the second side edge area; the corner area comprises a corner display area and a corner non-display area located on a side of the corner area away from the main display area; and the corner display area comprises a first sub-area close to the main display area and a second sub-area area away from the main display area; wherein the main display area, the first sub-area, and the second sub-area each comprise a plurality of through holes penetrating through the display panel, and the plurality of through holes define pixel islands for display and bridges for signal transmission; the plurality of through holes are disposed around the pixel islands; a part of the bridge is located between the pixel island and the through hole, and the other part of the bridge is located between adjacent through holes; and laminating the display panel to the curved cover plate, wherein after the display panel is laminated to the curved cover plate, an opening area of the through holes in the first sub-area is larger than the opening area of the through holes in the main display area, an opening area of the through holes in the second sub-area is smaller than the opening area of the through holes in the main display area, and a ratio of a first width of the through holes in the first sub-area to a first width of the through holes in the main display area is 1.1 to 1.5; a ratio of a first width of the through holes in the second sub-area to the first width of the through holes in the main display area is greater than 0 and less than 1, or equal to 0, wherein the first width is a width of the through hole at a center of the through hole.

16. The method according to claim 15, wherein the laminating the display panel to the curved cover plate comprises:

laminating the main display area of the display panel to a central area of the curved cover plate; and moving the peripheral area of the display panel to approach a broader area of the curved cover plate, and laminating the peripheral area of the display panel to the broader area of the curved cover plate.

17. The method according to claim 15, wherein the laminating the display panel to the curved cover plate comprises:

stretching the corner area of the display panel, wherein an elongation of the corner area is 0.5% to 5%;

laminating the main display area, the first side edge area and the second side edge area of the stretched display panel to the curved cover plate;

stretching the corner non-display area of the display panel to approach an outer contour line of the curved cover plate, and laminating the corner non-display area to the curved cover plate; and laminating the corner display area of the display panel to the curved cover plate after the corner non-display area being laminated to the curved cover plate.

* * * * *